March 19, 1929.  G. G. BARBER  1,705,849
FOOD PACKAGE
Filed May 6, 1927   2 Sheets-Sheet 1
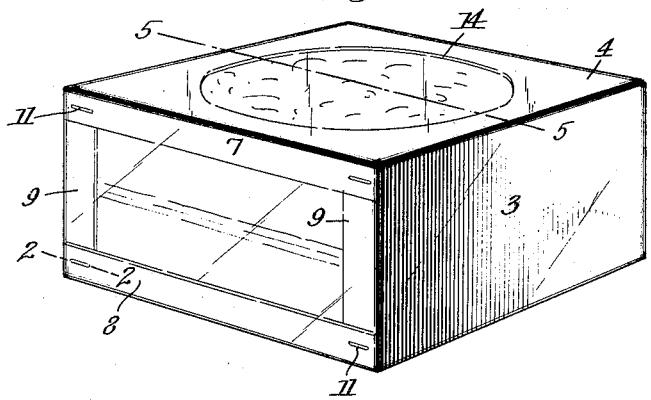
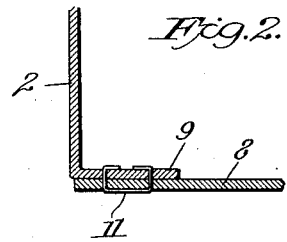
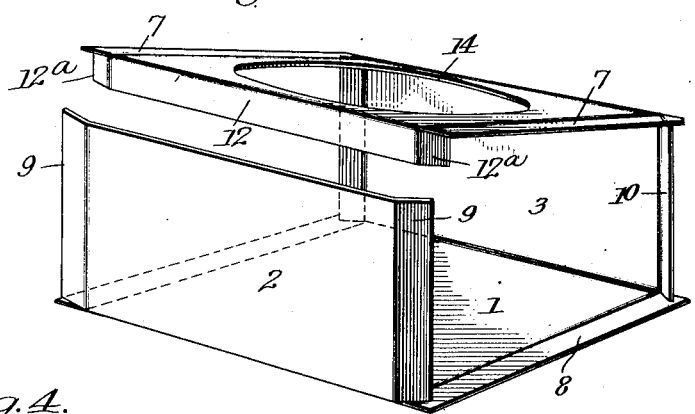
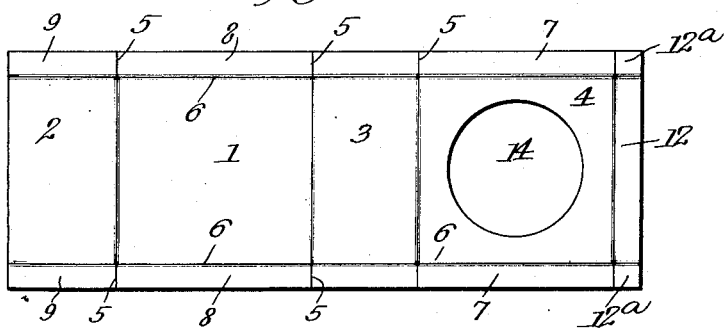
Inventor
George G. Barber March 19, 1929.  G. G. BARBER  1,705,849
FOOD PACKAGE
Filed May 6, 1927  2 Sheets-Sheet 2
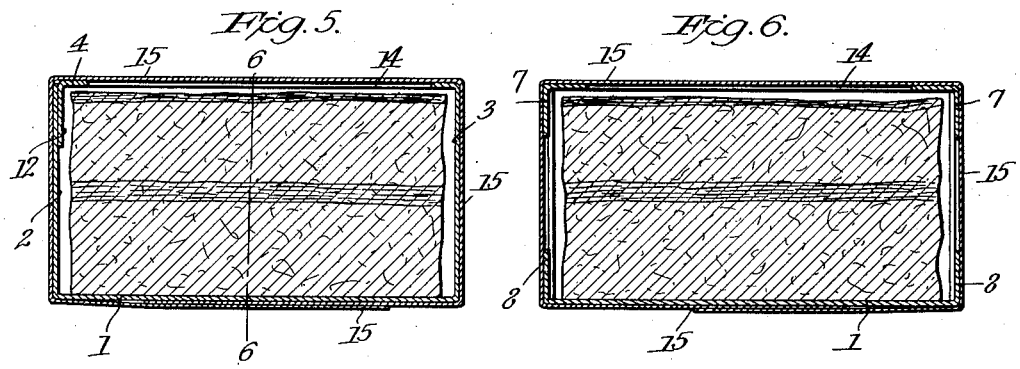
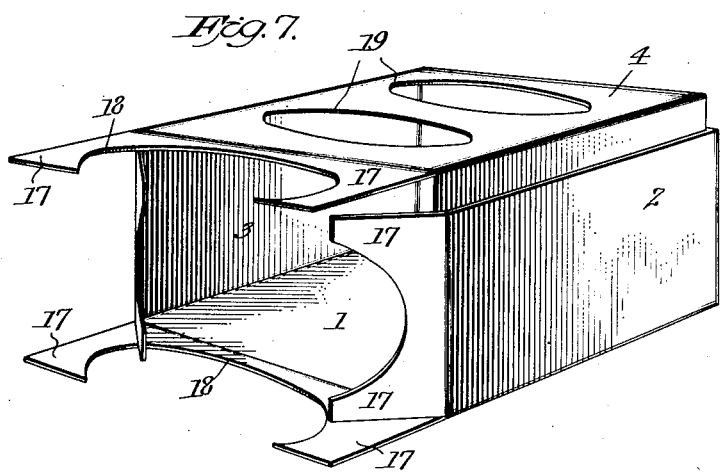
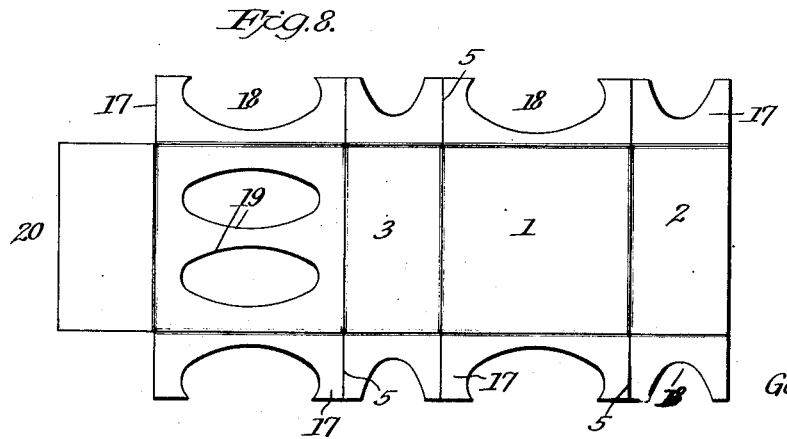
Inventor
George G. Barber
By
Attorneys Patented Mar. 19, 1929.

1,705,849

UNITED STATES PATENT OFFICE.

GEORGE G. BARBER, OF NEW ROCHELLE, NEW YORK, ASSIGNOR TO CONTINENTAL BAKING COMPANY, OF WILMINGTON, DELAWARE, A CORPORATION OF DELAWARE.

FOOD PACKAGE.

Application filed May 6, 1927. Serial No. 189,374.

The present invention relates to improvements in food packages of the character in which, while the contents are effectively protected from being injured or deleteriously affected by exposure to the atmosphere or by handling they may be readily inspected and the nature thereof displayed to interested parties.

The package of the present invention is especially adapted for marketing cake and provides a very simple means by which such commodity while maintained in a sealed container may be inspected to disclose the particular character thereof without breaking the wrapper in which it is enclosed.

In particular, the subject of the present application is an improvement upon the food package of my earlier application Serial No. 133,031 which has matured into Patent No. 1,687,052, issued Oct. 9, 1928, and among the improvements which distinguish the present invention from the disclosure of that application, may be mentioned the fact that by the improvements it is absolutely impossible to remove the contents of the package, and substitute another, without so breaking or mutilating the package as to disclose that it has been tampered with.

Like the package of my earlier application, the present invention contemplates providing a casing or container frame preferably made of suitable heavy paper or cardboard, within which the cake is positioned and which container frame or casing is completely surrounded by, and hermetically sealed within, a wrapper of transparent material such as suitably prepared paper.

The present invention relates particularly to the container frame or casing of the improved package which is interposed between the article of food and the outer transparent wrapping and has for its object to provide such a frame or casing from a blank of minimum size and without wasting any material part of the initial blank.

The invention will be described more in detail in connection with the accompanying drawings, and defined in the appended claims.

Referring to the drawings:

Figure 1 is a perspective view of a food package constructed in accordance with the present invention, the outer wrapping being removed.

Figure 2 is a detail section substantially on the line 2—2 of Figure 1.

Figure 3 is a perspective view of the container frame or casing in an incomplete condition.

Figure 4 is a plan of the blank from which the container frame or casing of Figures 1 to 3 is formed.

Figure 5 is a sectional view, substantially on the line 5—5 of Figure 1, of the complete package.

Figure 6 is a similar view, substantially on the line 6—6 of Figure 5.

Figure 7 is a perspective view of a slightly modified form of container frame, and Figure 8 is a plan of the blank from which the container frame or casing of Figure 7 is produced.

Referring to the drawings, in the several figures of which like parts are designated by the same reference characters, the container casing or frame is formed from a single sheet or blank of suitable material which is divided by transverse scores or grooves, permitting bending, to provide a bottom 1, end walls 2, 3 and a top 4.

Each section of the blank referred to is provided at its side edges with flaps which are separated from each other by slits 5 and are adapted to be bent, along scored lines 6 to extend substantially at right angles to the portion of the blank with which they are connected.

When the blank is bent upon the scores referred to, the flaps 7, 8 of the top 4 and bottom 1 will be positioned in overlapping relation to the flaps 9, 10 of the end walls 2, 3 and such overlapping flaps are permanently connected, or so connected that in order to obtain access to the container or frame it will be necessary to break such fastening or the flaps connected thereby. As shown the overlapping flaps are secured together by staples or metal fastening means 11, although if desired in some instance this connection may be by means of suitable glue, paste, etc.

In the embodiment of the invention illustrated in Figures 1 to 4, the free side of the top section 4 of the blank is provided with an extension 12, separated from the top by a suitable score line and this extension has flaps 12ᵃ which when the parts are in assembled relation will be in overlapping relation to the flaps 7, 9, before referred to.

It will be seen that by this arrangement of parts the flaps at the edges of the top, bottom and end walls of the container extend but partially over the sides of the container, thus providing apertures in both sides through which the contents of the frame or casing may be viewed.

Preferably there is also provided in the top 4 one or more openings or apertures 14 through which the contents of the package are also visible.

As previously noted, the invention is particularly intended for use in packaging cake for sale and with this particular commodity it is of considerable advantage to have such inspection openings in both the sides and top of the container. For example, by means of the apertures in the sides of the container, a purchaser can readily ascertain the character of the cake in the package to determine for example whether it is a layer cake or a plain cake. The aperture in the top 14 affords a means of noting the character of the coating of the top of the cake, that is whether the cake is provided with any special icing, for example.

As shown in Figures 5 and 6 the entire package is enclosed by a wrapping 15 of transparent paper or similar material which while sealing the package and protecting the contents from dust or moisture does not prevent inspection of such contents through the apertures in the sides and top of the container frame or casing as before referred to.

As shown in Figures 5 and 6 the contents of the package preferably contact only with the bottom 1 and the transparent wrapping 15 is held away from the body of the cake. This is of importance as it avoids staining the wrapper as results if such wrapper be applied directly to a piece of cake and, with certain kinds of cake such direct contact of the wrapper would result in coatings adhering to the wrapper and being detached from the body of the cake when the package is opened, thereby marring the appearance of the product.

It will be appreciated that cake is frequently provided with a coating which initially, at least, is of a soft, sticky, nature and in some instances under the methods now followed, it is necessary to wait some time after such a coating is applied before it will be sufficiently hard to permit the cake to be packaged.

By the present invention the operation of packaging cake can be practically completely and entirely effected by machinery without requiring handling by operatives and without any appreciable delay between the time the cake comes from the oven, or after a coating has been applied thereto.

The cake to be wrapped is deposited on the bottom section 1 of the blank and the blank bent upon the score lines to bring the ends and top into proper relation to the bottom and the overlapping flaps at opposite edges of the bottom and end walls connected, after which the container and cake therein may be mechanically wrapped in the transparent wrapper 15.

All of the foregoing steps may be carried out by suitable mechanism, whereby it will be unnecessary to handle the cake at all during the operation of packaging it.

The invention thus provides a very simple and sanitary means for packaging cake and further the permanent connection between the overlapping flaps of the ends, top and bottom, insures that the contents of the casing cannot be removed and others substituted without destroying such connection or so marring the appearance of the container frame as to clearly show that the package has been tampered with. It will be appreciated that if the transparent wrapper alone were relied upon as a means for retaining the several walls of the casing in operative relation, or if such walls are connected by readily detachable means, it would be possible by carefully removing the wrapper 15 and disengaging the connection between the walls of the container to remove the contents and substitute others. By permanently connecting the overlapping flaps, however, a purchaser is assured that the contents of the package when received by him are identically the same as was originally placed therein by the manufacturer.

The embodiment of the invention illustrated in Figures 1 to 4 provides rectangular-shaped apertures in the opposite sides of the container. By using a slightly different form of blank, however, such inspection apertures in the sides of the container may be made of different form as illustrated in Figures 7 and 8. In this embodiment of the invention the flaps 17 at the side edges of the bottom, top and end walls are not of the same width throughout their length, but are cut out as at 18 and when such flaps are brought into overlapping relation they provide an elliptical-shaped inspection opening. The flaps 17 of the top and bottom members of this embodiment of the invention are relatively wider than those of the form shown in Figures 1 to 4 and the projection 20 from the end of the top 4 is wider than the corresponding portion 12 of the blank of Figure 4. The frame or casing formed from this blank, therefore, is somewhat heavier than that obtained by using the blank of Figure 4.

As previously stated and particularly shown in Figures 7 and 8, the top 4 may have a plurality of inspection openings 19 instead of the single opening 14 of Figures 1 to 4 and, of course, there can be other modifications of details without departing from the present invention. If desired, of course, the casing of Figures 1 to 3 may have two apertures in its top instead of the single one shown.

The advantage of having the two openings 19 in the top is that thereby the package is adapted to contain two pieces of cake, which may be of different type or character, as is frequently desirable, both the top and side of each piece being visible through the openings in the frame.

The blank from which the casing of Figures 1 to 3 is provided requires slightly less material than that of the form shown in Figures 7 and 8, and therefore, the container frame of Figures 1 to 3 is more economical of material and slightly cheaper of manufacture than the form shown in Figures 7 and 8.

It is believed that the advantages and purposes of the invention will be readily appreciated from the foregoing description in connection with the drawings.

While I have herein referred to the invention being particularly adapted for use in marketing cake, for which it is specially adapted and intended, it might be employed with advantage in connection with other forms of pastry or any commodity where it is desired to have a container, completely enclosed by a transparent wrapper, which permits inspection of the contents as pointed out in the claims.

What I claim is:

1. A container formed from a blank bent to provide top, bottom, and end walls, each having securing flaps projecting from both side edges, the flaps of the end walls being in overlapping relation with and secured to the flaps of the top and bottom to retain the parts in operative position and provide partial closures for the sides of the container, the apertures thus formed in the sides permitting inspection of the contents of the container without opening it.

2. A container formed from a blank bent to provide top, bottom and end walls, each having flaps projecting from both side edges, the flaps of the end walls being secured to the flaps of the top and bottom to retain the parts in operative position and portions of each flap being of a width less than one-half the width of any of the sections to provide partial closures for the sides of the container and form apertures in the sides permitting inspection of the contents of the container without opening it.

3. A container formed from a blank bent to provide top, bottom and end walls, each having relatively narrow flaps, of substantially uniform width throughout their length, extending from its opposite side edges, the flaps of the end walls being connected with those of the top and bottom, and opposed flaps at each side of the container being spaced apart whereby the flaps collectively constitute a wall having the form of a substantially rectangular frame bounding an opening through which the contents of the container may be viewed.

4. A container formed from a blank bent to provide top, bottom and end walls, each having flaps projecting from both side edges and the top having an aperture formed therein, the flaps of the end walls being secured to the flaps of the top and bottom to retain the parts in operative position and provide partial closures for the sides of the container, the apertures thus formed in the sides and the aperture in the top permitting inspection of the contents of the container from three directions without opening it.

In testimony whereof I have hereunto set my hand.

GEORGE G. BARBER.